P. REINWALD.
RAKE.
APPLICATION FILED SEPT. 15, 1919.
1,394,353.
Patented Oct. 18, 1921.
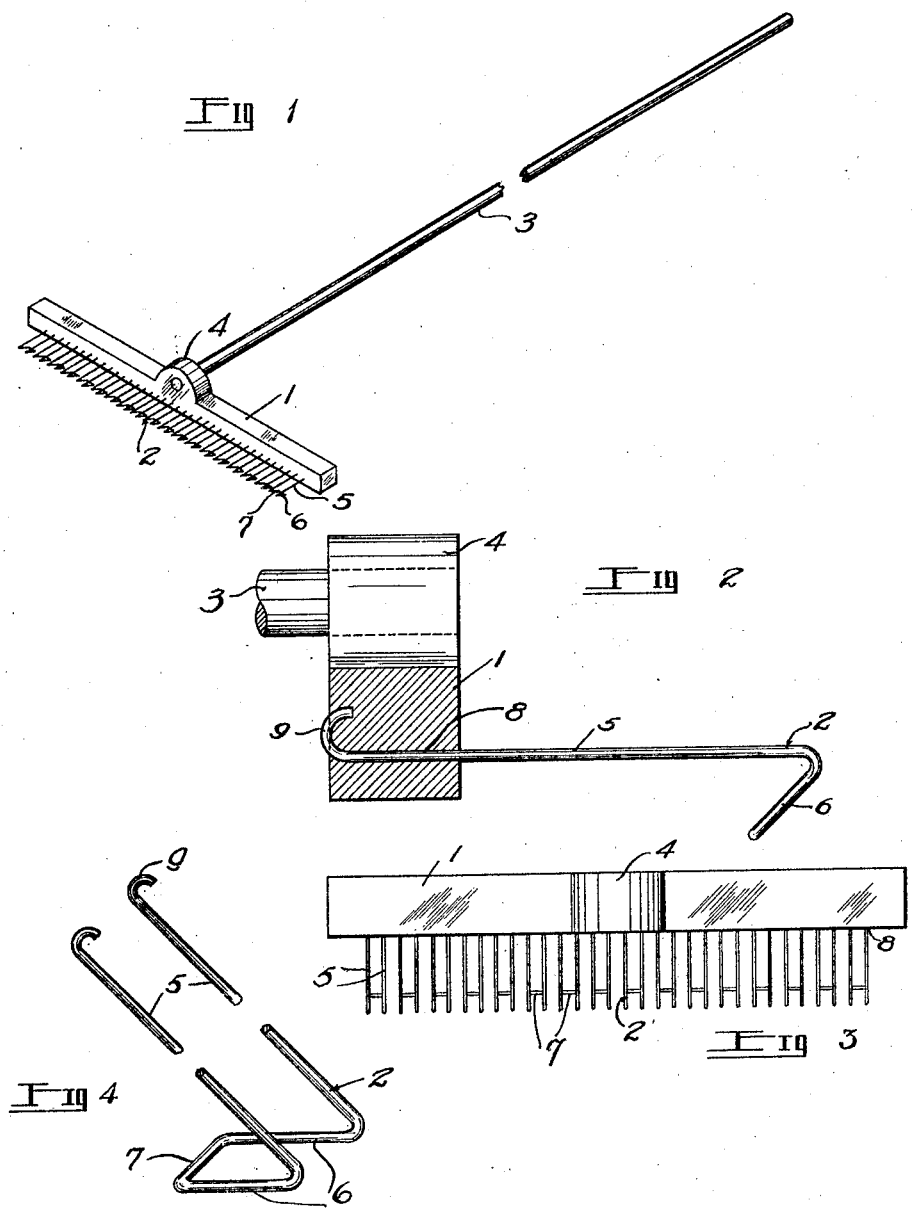
WITNESS:
H. A. Sherburne.
INVENTOR.
Paul Reinwald.
BY White Prost
his ATTORNEYS.

UNITED STATES PATENT OFFICE.

PAUL REINWALD, OF MENLO PARK, CALIFORNIA.

RAKE.

1,394,353.  Specification of Letters Patent.  Patented Oct. 18, 1921.

Application filed September 15, 1919. Serial No. 323,815.

*To all whom it may concern:*

Be it known that I, PAUL REINWALD, a citizen of the United States, and a resident of Menlo Park, San Mateo county, State of California, have invented a new and useful Improvement in Rakes, of which the following is a specification.

My invention relates to improvements in rakes for use on lawns, gravel walks, pavements and other surfaces.

An object of my invention is to provide a rake of the character described, in which the teeth are constructed and arranged so that leaves and other debris may be raked from grass lawns, gravel walks, and hard pavements, without scratching or scraping or injuring such surfaces.

Another object of the invention is to provide a strong, durable, light and inexpensive rake of the character described.

The invention possesses other features of advantage, some of which, with the foregoing, will be set forth in the following description of the preferred form of my invention, which is illustrated in the drawings accompanying and forming part of the specification. It is to be understood that I do not limit myself to the showing made by the said drawings and description, as I may adopt variations of the preferred form within the scope of my invention as set forth in the claim.

Referring to the drawings:

Figure 1 is a perspective view of a rake constructed in accordance with my invention.

Fig. 2 is a side elevation of the rake with the head cross sectioned, showing the manner of securing the teeth to the head.

Fig. 3 is a top plan view of the rake, with the handle removed.

Fig. 4 is a fragmentary detail perspective view of one of the rake teeth.

In carrying out my invention, I employ a rake head having forwardly and downwardly projecting teeth arranged in such relation to the head and handle and of such construction that they will effectively collect or gather debris and slide smoothly over the surface being raked, without scratching, deranging or injuring said surface.

My invention comprises a preferably wooden rectilinear rake head 1 carrying a plurality of forwardly, downwardly, and rearwardly projecting blunt teeth 2, and a handle 3 which is secured in a socket 4 on said head. The handle preferably lies in a plane parallel to the plane of the forwardly projecting portions of the teeth, so as to cause the downwardly and rearwardly projecting portions of the teeth to lie substantially parallel to and slide freely over the surface to be raked when the handle is held in the ordinary and normal inclined raking position.

In order to secure lightness, strength, durability and cheapness of construction, I preferably form the teeth of stiff resilient wire. Each tooth is formed of a single strand of wire doubled from a point centrally of its ends and bent to form spaced, straight, substantially parallel portions or arms 5, downwardly and rearwardly extending substantially parallel and spaced arm portions 6 joined to the outer ends of the arms 5, and a short, substantially horizontal, bight portion 7 joining the lower ends of the arms 6 and being curved upwardly slightly where joined to said arms. The arms 6 are preferably disposed at an angle of 45° with relation to the arms 5 so as to lie substantially parallel to the surface being raked and to slide smoothly rather than scrape over said surface, as is the case with the ordinary rake.

The teeth in the form hereinbefore described, are inserted through apertures 8, which apertures are arranged in pairs in the head 1 to receive the portions or arms 5 of the teeth, and the apertures are preferably formed so as to space the teeth substantially one inch apart, although they may be otherwise spaced as desired.

To secure or anchor the teeth in the head 1, the free ends of the arms 5 are bent up as at 9, so as to engage the rear face of the head, and these bent-up ends may be forced into the wood as shown in Fig. 2 of the drawings.

I claim:

A rake construction comprising a head bar of rectilinear cross section, teeth consisting each of a single piece of wire bent to form parallel shanks connected by a straight bight portion or bar and having the free ends thereof passing laterally rearward through the head bar parallel to the bottom thereof, said ends being clenched over upwardly at the back of the head bar and driven into it, said shanks being bent downwardly near the bight portion, at an acute angle with the main axis of the shanks to form a claw arm.

In testimony whereof, I have hereunto set my hand at San Francisco, California, this 3rd day of September, 1919.

PAUL REINWALD.

In presence of—
H. G. Prost.